United States Patent
Choi et al.

(10) Patent No.: US 7,613,187 B2
(45) Date of Patent: Nov. 3, 2009

(54) SHARED LAN EMULATION METHOD AND APPARATUS HAVING VLAN RECOGNITION AND LLID MANAGEMENT FUNCTIONS ON EPON

(75) Inventors: Su Il Choi, Daejeon (KR); Tae Il Kim, Daejeon (KR); Hyeong Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1286 days.

(21) Appl. No.: 10/868,479

(22) Filed: Jun. 14, 2004

(65) Prior Publication Data

US 2005/0083950 A1    Apr. 21, 2005

(30) Foreign Application Priority Data

Oct. 21, 2003    (KR) ...................... 10-2003-0073264

(51) Int. Cl.
*H04L 12/28* (2006.01)
*H04B 10/00* (2006.01)
*H04B 10/20* (2006.01)
*H04J 14/06* (2006.01)

(52) U.S. Cl. .................. 370/392; 370/395.53; 370/400; 398/58; 398/70; 398/168

(58) Field of Classification Search ................ 370/389, 370/392, 395.53, 400; 398/43, 58, 70, 168
See application file for complete search history.

(56) References Cited

U.S. PATENT DOCUMENTS

| | | | |
|---|---|---|---|
| 2003/0190168 A1* | 10/2003 | Song et al. ................... | 398/168 |
| 2004/0100962 A1* | 5/2004 | Kim et al. ................... | 370/392 |
| 2004/0109450 A1* | 6/2004 | Kang et al. ................. | 370/390 |
| 2004/0114592 A1* | 6/2004 | Kang et al. ................. | 370/389 |
| 2004/0120315 A1* | 6/2004 | Han et al. ................... | 370/389 |
| 2004/0184474 A1* | 9/2004 | Kim et al. ................... | 370/445 |
| 2005/0058118 A1* | 3/2005 | Davis et al. ................. | 370/351 |
| 2005/0058452 A1* | 3/2005 | Kramer et al. ............... | 398/71 |
| 2005/0249498 A1* | 11/2005 | Haran et al. ................. | 398/58 |

FOREIGN PATENT DOCUMENTS

KR    010076078    8/2001

* cited by examiner

*Primary Examiner*—Dang T Ton
*Assistant Examiner*—Ryan C. Kavleski
(74) *Attorney, Agent, or Firm*—Blakely, Sokoloff, Taylor & Zafman LLP

(57) ABSTRACT

Disclosed herein is a shared Local Area Network (LAN) emulation method and apparatus. The method includes the following four steps. At the first step, a Logical Link Identifier (LLID) management table is set up to assign unique LLIDs to a plurality of Optical Network Units (ONUs) and manage the assigned LLIDs so as to identify the plurality of ONUs connected to a single Optical Line Terminal (OLT). Thereafter, a MAC address table is set up for the LLIDs to learn MAC addresses of the ONUs. Thereafter, the unique LLIDs are assigned to ONUs when the ONUs request registration from the OLT. Finally, data frames, which are received by a Shared LAN Emulation (SLE) layer of the OLT, are bridged using the LLIDs, VIDs of Virtual LANs to which the ONUs belong and destination MAC addresses of the data frames so as to provide a single matched port between a Logical Link Control (LLC) layer and a MAC layer of the OLT.

8 Claims, 9 Drawing Sheets

| Index | LLID | ONU MAC address | VLAN IDs | Authentification information | Connection setup information | Subscriber MAC table pointers |
|---|---|---|---|---|---|---|
| 1 | 0x aa | 00:00:00:00:00:01 | 1,2 | Y | Y | p1 |
| 2 | 0x bb | 00:00:00:00:00:02 | 2 | Y | N | p2 |
| | | | pm | | | |
| n | 0x xx | xx:xx:xx:xx:xx:xx | n | Y | N | pn |
| m | 0x yy | yy:yy:yy:yy:yy:yy | m | N | N | pm |

510 — Index
520 — LLID
530 — ONU MAC address
540 — VLAN IDs
550 — Authentification information
560 — Connection setup information
570 — Subscriber MAC table pointers

FIG. 5

SHARED LAN EMULATION METHOD AND APPARATUS HAVING VLAN RECOGNITION AND LLID MANAGEMENT FUNCTIONS ON EPON

BACKGROUND OF THE INVENTION

1. Field of the Invention

The present invention relates generally to Ethernet passive optical networks, and more particularly, to a local area network emulation method and apparatus using logical link identifiers that are used for point-to-point communications and broadcasting in an Ethernet passive optical network.

2. Description of the Related Art

Currently, for the economical construction of a network suitable for the provision of broadband services, a Passive Optical Network (PON) based on Ethernet attracts attention. Ethernet PON (EPON) has been standardized by the IEEE 802.3ah Ethernet First Mile (EFM) task force. In general, PON is constructed to use Optical Distribution Networks (ODNs) between Optical Line Terminal (OLT) and Fiber To The Home (FTTH) Optical Network Terminations (ONTs) or Fiber To The Curb/Cabinet (FTTC) Optical Network Units (ONUs), and adapts a network topology in which all ONUs/ONTs are distributed in the form of a bus or tree structure.

FIG. 1 is a configuration diagram of an EPON system.

Referring to FIG. 1, the EPON system has a point-to-multipoint structure, in which a plurality of ONUs 101 installed on subscriber sides, such as houses or offices, share an Optical Line Terminal (OLT) 103 installed on a central office side and connected to the ONUs 101 through ODNs 102 using optical cables. Accordingly, downstream transmission in which a message is transmitted from the OLT 103 to the plurality of ONU 101 is performed in a broadcasting manner. In contrast, upstream transmission in which a message is transmitted from one of the plurality of ONUs 101 to the OLT 103 is performed in multipoint-to-point manner. In the EPON system constructed as described above, subscribers are provided with a variety of services, such as Internet services, telephone services and interactive video services, through video/audio networks, Internet Protocol (IP) networks, Asynchronous Transfer Mode (ATM) networks, Time Division Multiplexing (TDM)/Public Switched Telephone Networks (PSTN) networks, etc.

In such a PON scheme, it is possible for users to share exchange equipment and optical resources. The optical distribution network is passive, so that maintenance costs are low and high flexibility is provided to allow a provider to easily add and delete splits. Furthermore, the PON scheme is advantageous in that costs per subscriber are low because intensive resource sharing is realized.

FIG. 2 is a diagram showing the layered architectures of the OLT 103 and ONU 101 in a conventional EPON. The layered architectures shown in FIG. 2 have been adapted in IEEE802.3ah standards.

Referring to FIG. 2, the physical layers of the Open Systems Interconnection (OSI) reference model layers of the OLT 103 and the ONU 101 are constructed as described below. The OLT 103 and the ONU 101 are connected to a passive optical medium 210 through two Medium Dependent Interfaces (MDI) 211 and 241, respectively. Two Physical Medium Dependents (PMDs) 212 and 242, two Physical Medium Attachments (PMAs) 213 and 243, and two Physical Coding Sublayers (PSCs) 214 and 244 are connected to two reconciliation sublayers 216 and 246 through two Gigabit Media Independent Interfaces (GMII) 215 and 245, respectively. The reconciliation sublayers 216 and 246 are connected to two higher layers, that is, two data link layers, respectively.

Each of the two data link layers is divided into one or more Medium Access Control (MAC) layers 220 or 250, a multipoint MAC control layer 221 or 251, one or more optionally added Operations, Administration & Maintenance (OAM) layers 222 or 252, and one or more Logical Link Control (LLC) layers 223 or 253. The LLC layers 223 or 253 are connected to an upper layer 230 or 260.

In this case, the ONU 101 has a single MAC layer 250. In contrast, a plurality of ONUs 101 are connected to the OLT 103, so that the OLT 103 should accommodate independent MACs 220 the number of which corresponds to the number of connected ONUs 101. When the branching ratio between the OLT 103 and the ONU 101 is 1:16, 1:32 or 1:64, the OLT 103 has 16, 32 or 64 MACs 220 according to the corresponding branching ratio.

In general, the term "bridging" refers to a function of enabling data to be transmitted between networks by interconnecting the networks employing similar MAC protocols. Such bridging function is performed by the LLC layers 223 and 253 and the upper layers 230 and 260.

In the conventional layered architectures, the OLT 103 has independent MAC layers 220 and LLC layers 223, the number of each of which corresponds to the number of ONUs 101 connected to the OLT 103. In this case, a plurality of physical connection ports are required to connect the plurality of MAC layers 220 with the plurality of LLC layers 223. However, a problem arises in that it is very difficult to form and match the plurality of independent physical ports.

SUMMARY OF THE INVENTION

Accordingly, the present invention has been made keeping in mind the above problems occurring in the prior art, and an object of the present invention is to provide a shared LAN emulation method and apparatus that provides a single matched interface between MAC layers and a LLC layer by allowing a bridging function to be performed in a layer lower than the LLC layer.

Another object of the present invention is to provide a shared LAN emulation method and apparatus, which is capable of preventing a collision in the matching of bridging between EPON having a point-to-multipoint structure and IEEE 802.1D having a point-to-point structure.

In order to accomplish the above object, the present invention provides a shared LAN emulation method, comprising the steps of setting up a Logical Link Identifier (LLID) management table for assigning unique LLIDs to a plurality of Optical Network Units (ONUs) and managing the assigned LLIDs so as to identify the plurality of ONUs connected to a single Optical Line Terminal (OLT); setting up a MAC address table for the LLIDs learning MAC addresses of the ONUs; assigning the unique LLIDs to ONUs when the ONUs request registration from the OLT; and bridging data frames, which are received by a Shared LAN Emulation (SLE) layer of the OLT, using the LLIDs, VIDs of Virtual LANs to which the ONUs belong and destination MAC addresses of the data frames so as to provide a single matched port between a Logical Link Control (LLC) layer and a MAC layer of the OLT.

The LLID management table may include LLIDs for identifying the ONUs; ONU MAC addresses corresponding to the MAC addresses of the ONUs having requested connection from the OLT; VIDs for identifying virtual LANs of groups of ONUs to which the ONUs belong; authentication information fields for determining whether connection of the ONUs is allowed; connection setup information fields for determining whether the ONUs have been connected to the OLT and links have been set up therebetween; and subscriber MAC table pointer fields for the respective LLIDs, the subscriber MAC table point fields corresponding to pointer values of the MAC table, the MAC table being set up by learning the MAC addresses for the respective LLIDs.

The MAC address table may include LLIDs, MAC addresses and VIDs.

The step of assigning LLIDs may comprise the steps of if the ONUs having requested registration have been already registered and LLIDs having been already assigned to the ONUs exist, assigning the LLIDs having been already assigned to the ONUs having requested registration; if the ONUs having requested registration have been already registered but the LLIDs having been already assigned to the ONUs do not exist, assigning available LLIDs to the ONUs having requested registration; and if the ONUs having requested registration have been already registered but the LLIDs having been already assigned to the ONUs and the available LLIDs do not exist, assigning new dynamic LLIDs or LLIDs appointed by an operator to the ONUs having requested registration.

The step of bridging the data frames may comprise the steps of, if each of the received data frames entering the SLE layer corresponds to a broadcast frame and have a VID, transmitting the received data frame to only an ONU group having a VID identical with the VID of the data frame; if the received frame corresponds to the broadcast frame entering the SLE layer from a layer higher than the SLE layer but do not have a VID, transmitting the data frame so that all the ONUs can receive packets; if the received frame corresponds to the broadcast frame entering the SLE layer from a layer lower than the SLE layer but do not have a VID, transmitting the data frame so that only an ONU having a source LLID cannot receive a packet; if the received frame has the VID of the destination LLID and but VID of the received frame is different from the VID of the destination LLID, discarding the received unicast frame; and if the received frame has the VID of the destination LLID and the VID of the received frame is identical with the VID of the destination LLID, setting the LLID of the frame to the destination LLID and transmitting the unicast frame.

BRIEF DESCRIPTION OF THE DRAWINGS

The above and other objects, features and advantages of the present invention will be more clearly understood from the following detailed description taken in conjunction with the accompanying drawings, in which:

FIG. 5 shows a LLID management information table for respective ONUs, which is used in the shared LAN emulation apparatus according to the embodiment of the present invention;

DESCRIPTION OF THE PREFERRED EMBODIMENTS

Figure 1:
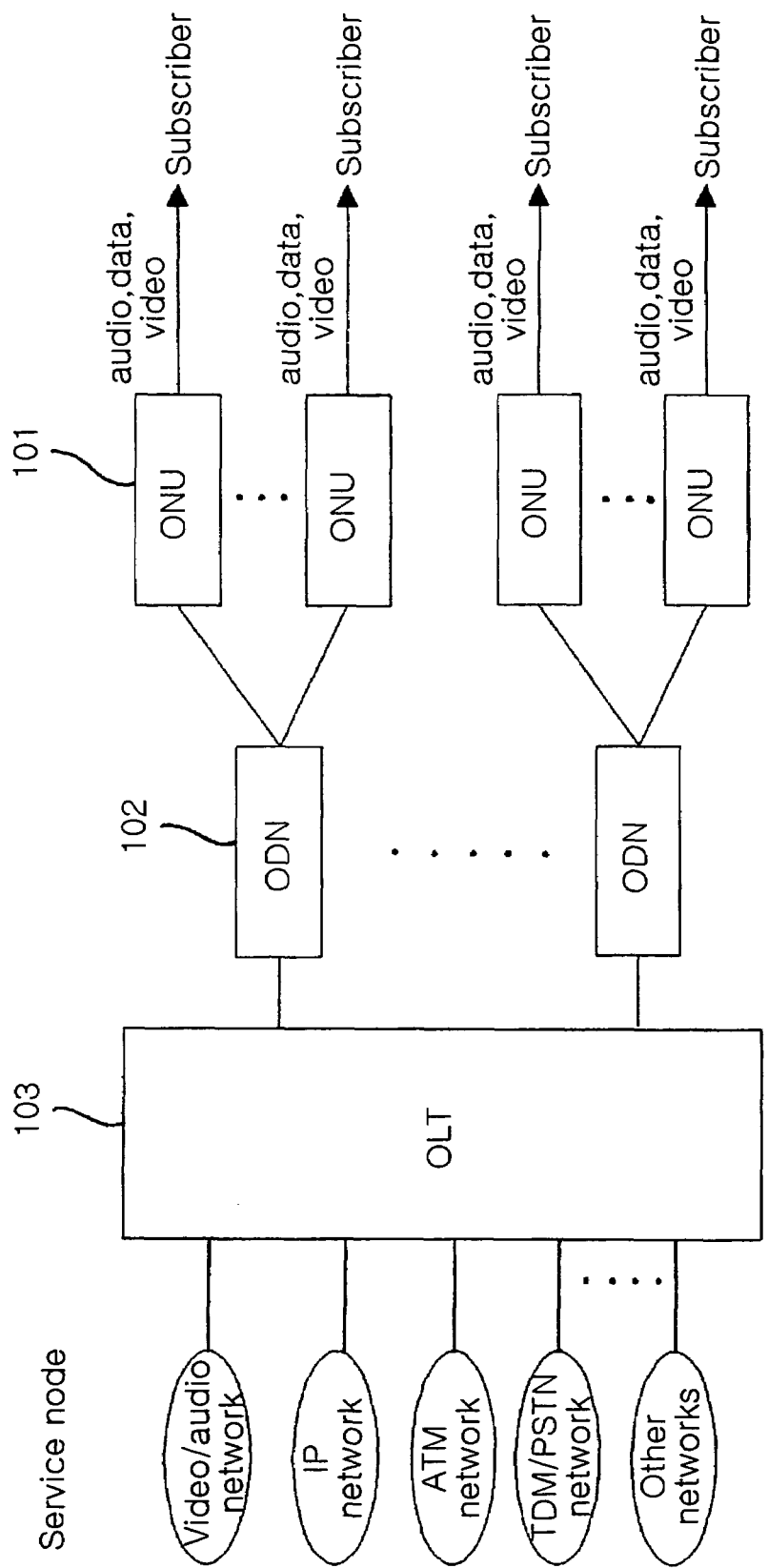
FIG. 1 is a configuration diagram of an EPON system.

Reference now should be made to the drawings, in which the same reference numerals are used throughout the different drawings to designate the same or similar components.

Figure 3:
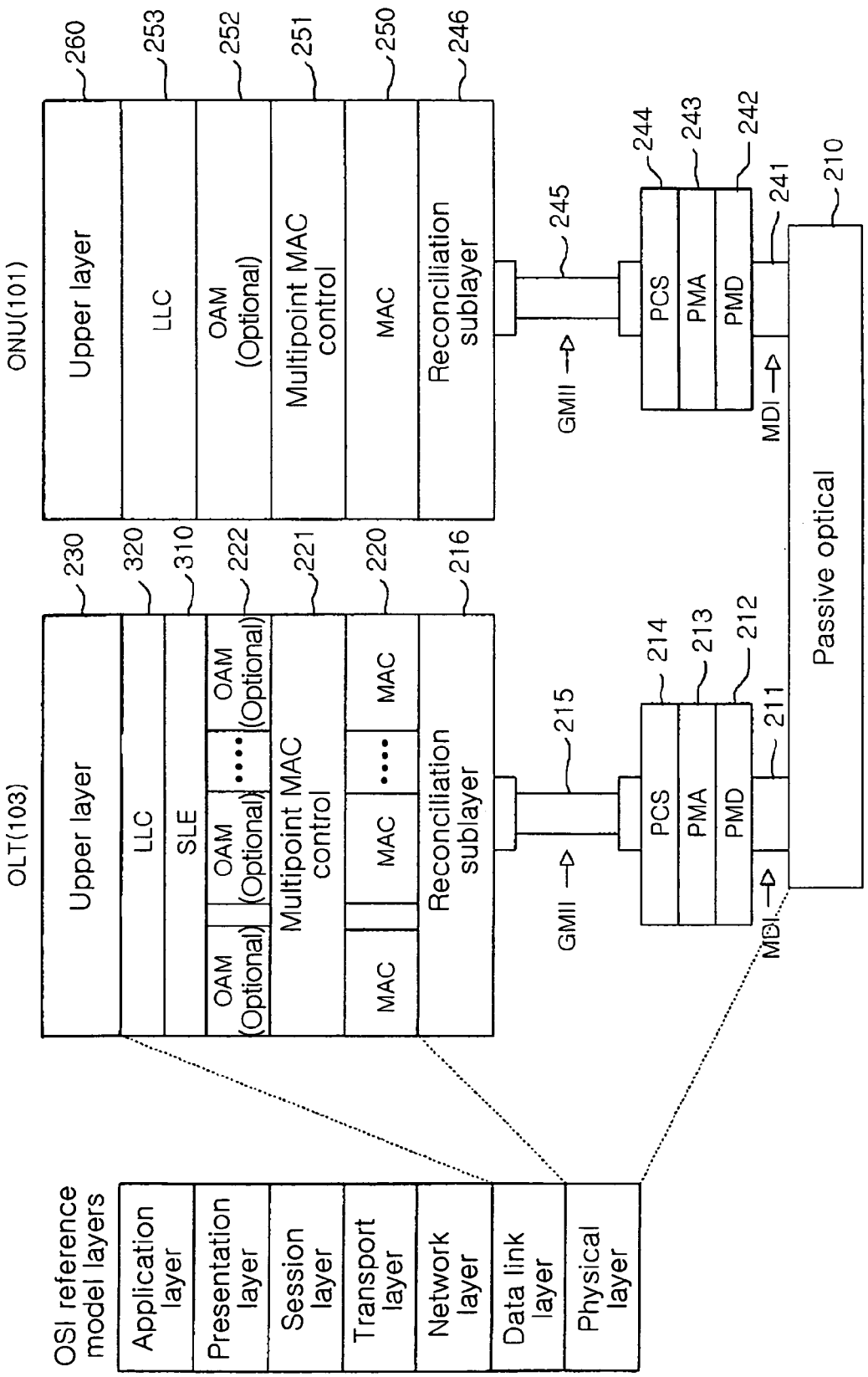
FIG. 3 is a diagram showing the layered architectures of an OLT 103 and an ONU in an EPON in accordance with an embodiment of the present invention.

FIG. 3 is a diagram showing the layered architectures of an OLT 103 and an ONU 101 in an EPON in accordance with an embodiment of the present invention.

Figure 2:
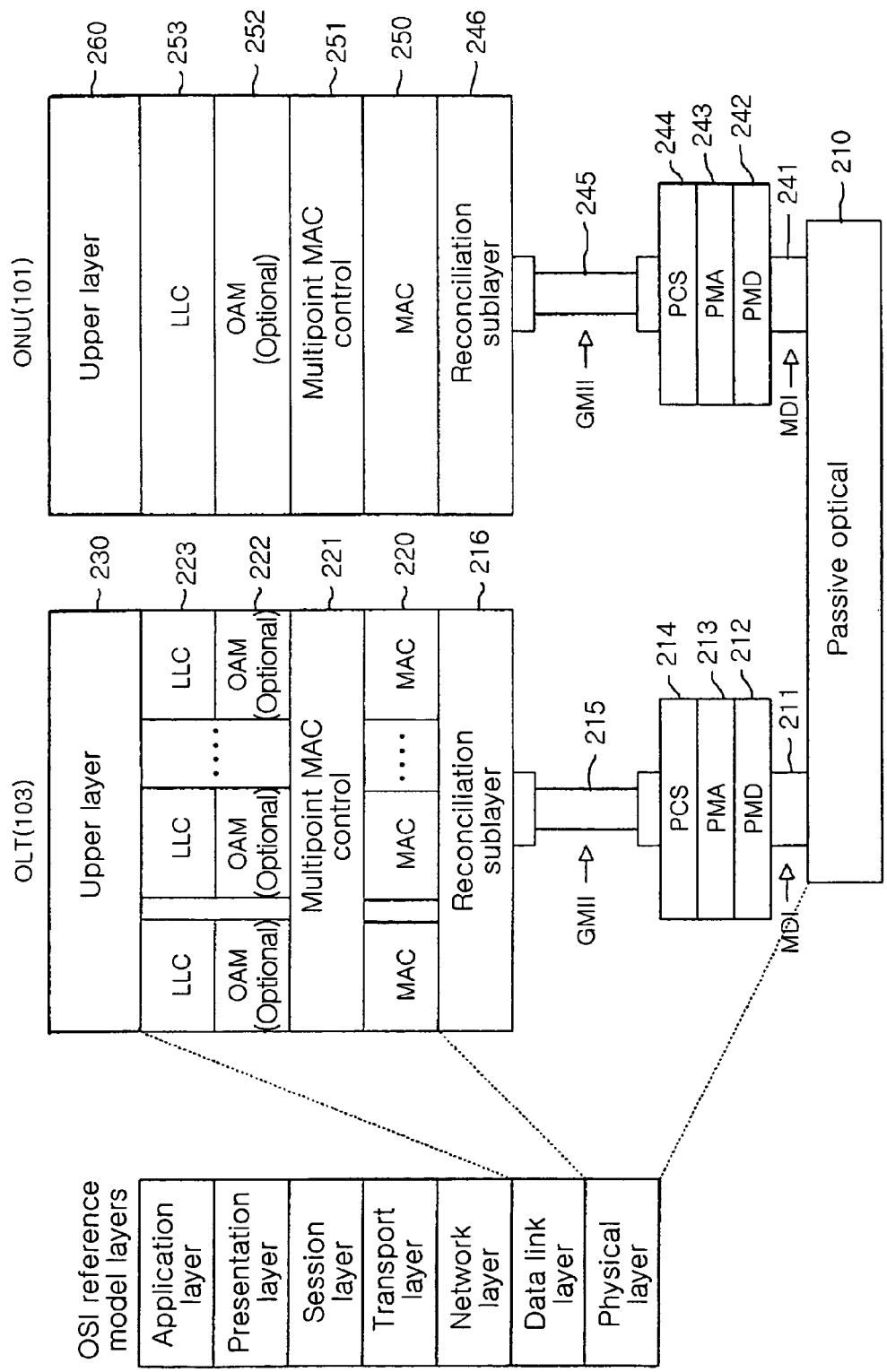
FIG. 2 is a diagram showing the layered architectures of an OLT and an ONU in a conventional EPON.

Referring to FIG. 3, in the embodiment of the present invention, the OLT 103 further includes a Shared LAN Emulation (SLE) layer 310, which is an optional layer of IEEE 802.3ah EMF standards, above a multipoint MAC control layer 221. When optional OAM layers 222 are employed, the SLE layer 310 is located above the OAM layers 222. A single LLC layer 320 is located above the SLE layer 310. Meanwhile, the other layers and elements are the same as those of FIG. 2.

Even when a plurality of ONUs 101 are connected to the OLT 103 using the shared LAN emulation method and apparatus in accordance with the embodiment of the present invention, the OLT 103 performs a bridging function at the data link layer thereof. That is, the OLT 103 performs the bridging function at a layer lower than the LLC layer 320 or layer higher than the MAC layers 220. Furthermore, unlike the conventional OLT having a plurality of independent LLC layers, the OLT 103 has a single integrated LLC layer 320. The plurality of independent MAC layers 220 formed in the OLT 103 are connected to the LLC layer 320 through the multipoint MAC control layer 221 and the single SLE layer 310. When the optional OAM layers 222 are employed, the plurality of MAC layers 220 are connected to the LLC layer 320 sequentially through the multipoint MAC control layer 221, the OAM layers 222 and the SLE layer 310.

A shared LAN emulation method of providing a single matched interface above the plurality of independent MAC layers 220, internally performing a bridging function, and registering and managing a plurality of ONUs 101 in the SLE layer 310 of the embodiment of the present invention below.

Figure 4A:
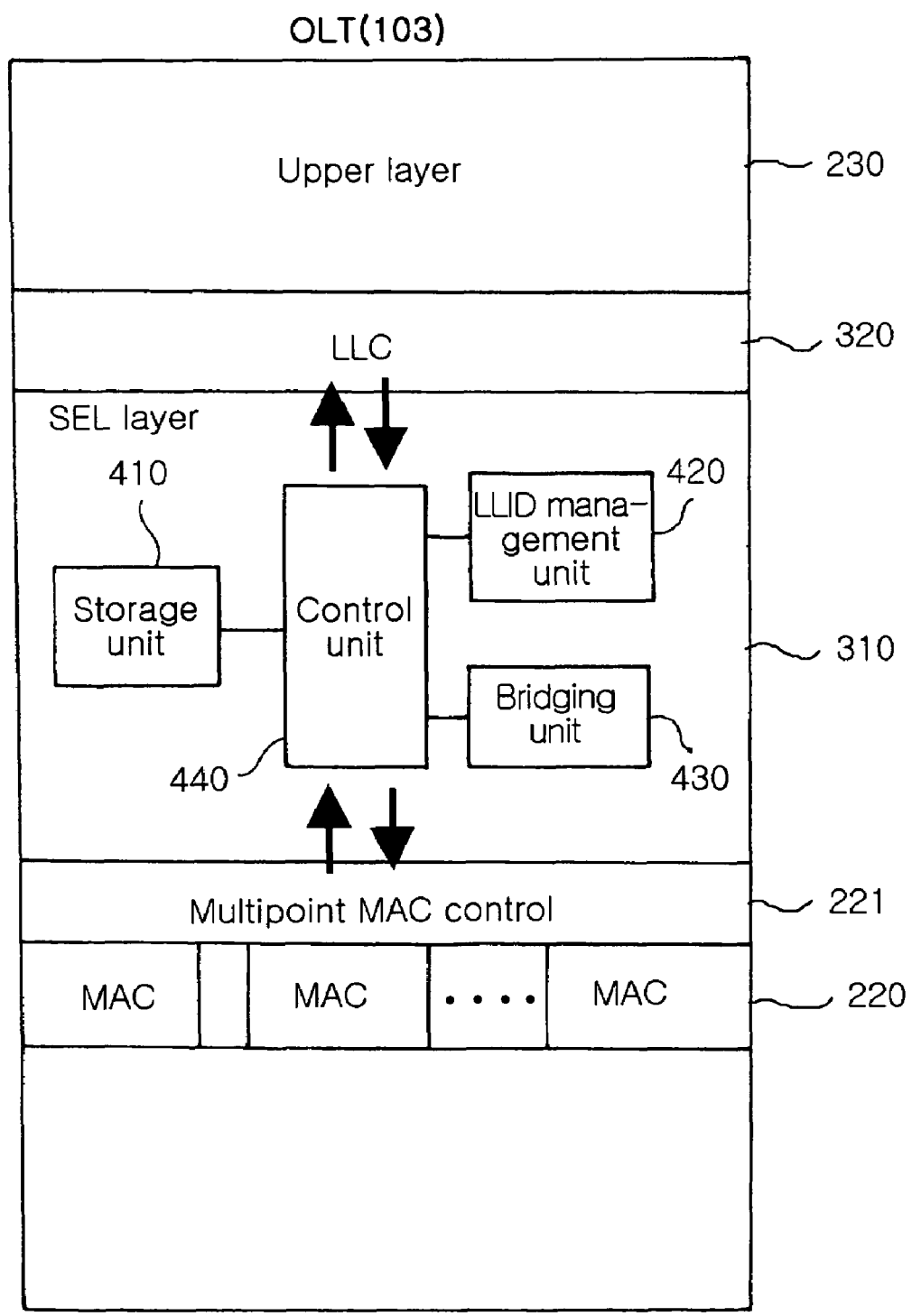
FIG. 4a is a diagram showing a shared LAN emulation apparatus in accordance with an embodiment of the present invention.

FIG. 4a shows a shared LAN emulation apparatus in accordance with an embodiment of the present invention.

Referring to FIG. 4a, the shared LAN emulation apparatus according to the embodiment of the present invention includes a storage unit 410, a Logical Link Identifier (LLID) management unit 420, a bridging unit 430 and a control unit 440, and is formed in the SLE layer 310 of the OLT 103.

The storage unit 410 stores a LLID management table for assigning different LLIDs to ONUs and managing the assigned LLIDs so as to identify a plurality of ONUs. The storage unit 410 further stores a MAC address table for the LLIDs learning the MAC addresses of the ONUs 101. Although, in FIG. 4a, the LLID management table and the MAC address table are shown as being stored in the single storage unit 410, the LLID management table and the MAC address table may be stored in respective storage units.

The LLID management unit 420 is used to assign a unique LLID to an ONU 101 and manage the assigned LLID when the ONU 101 requests registration from the OLT 103.

The bridging unit 430 bridges data frames received by the MAC layers 220 using the LLIDs, the virtual LAN identifiers (VIDs) of certain groups to which the ONUs 101 belong, and the destination MAC addresses of the data frames so as to provide a single matched port to the LLC layer 320 of the OLT 103.

The control unit 440 controls the storage unit 410, the LLID management unit 420 and the bridging unit 430. Although in FIG. 4a, the control unit 440 is shown as being a separate block, the control unit 440 may be formed in the LLID management unit 420 or bridging unit 430.

Figure 4B:
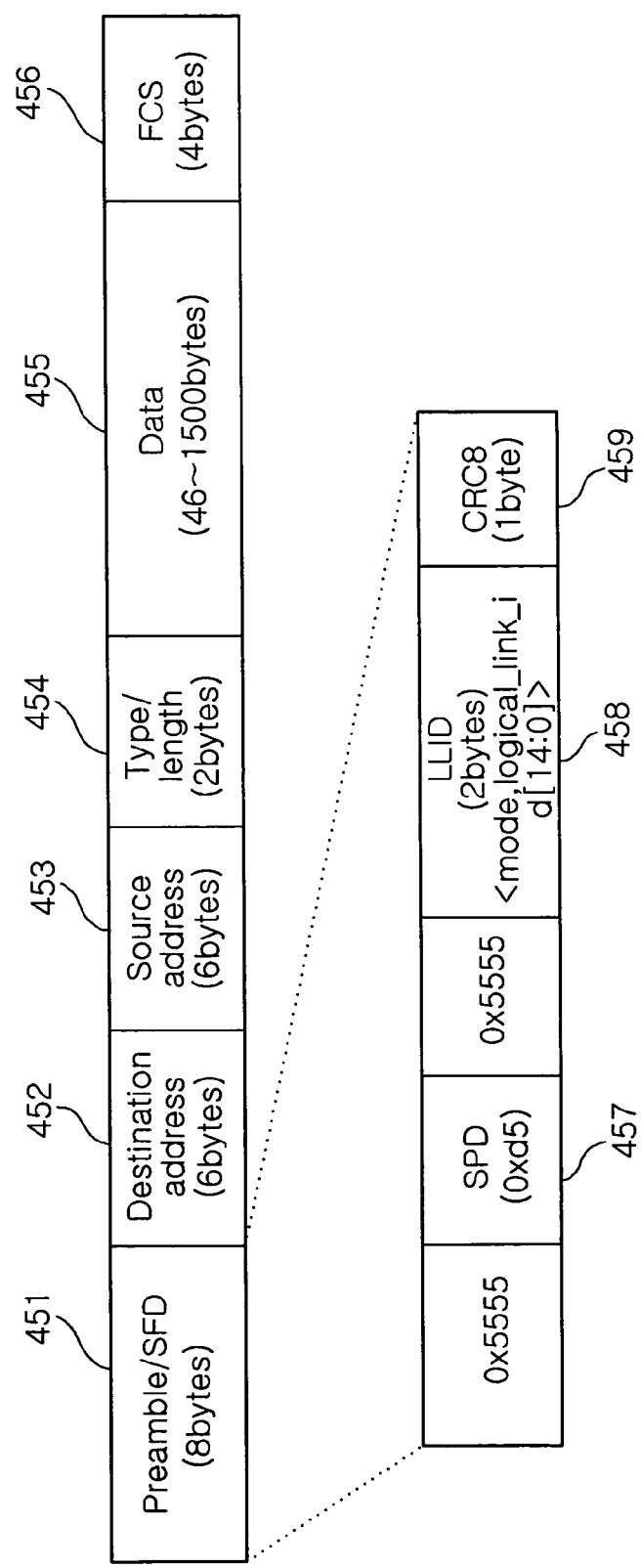
FIG. 4b is a diagram showing the format of frames in which a LLID is included in a preamble when the frames are exchanged between the OLT and the ONUs.

FIG. 4b shows the format of frames in which a LLID is included in a preamble when the frames are exchanged between the OLT 103 and the ONUs 101.

Each of the data frames exchanged between the OLT 103 and the ONUs 101 includes a preamble/SFD field 451, a destination address field 452, a source address field 453, a type/length field 454, a data field 455 and a Frame Check Sequence (FCS) field 456. The preamble/SFD filed 451 includes a SPD field 457, an LLID field 458, and a Cyclic Redundancy Check field 459.

When a frame is transmitted from the ONU 101 to the OLT 103, the value of the LLID field 458 is representative of a source ONU 101. In contrast, when a frame is transmitted from the OLT 103 to the ONU 101, the value of the LLID field 458 is representative of a destination ONU 101.

FIG. 5 shows a LLID management information table for respective ONUs, which is used in the shared LAN emulation apparatus according to the embodiment of the present invention.

Referring to FIG. 5, the LLID management information table required for the performance of the function of the SLE layer 310 according to the embodiment of the present invention includes indexes 510, LLIDs 520, ONU MAC addresses 530, VIDs 540, authentification information fields 550, connection setup information fields 560 and subscriber MAC table pointer fields for respective LLIDs 570.

In this case, the maximal value of the indexes 510 is the maximal number of ONUs 101 connectable to a port of the OLT, and has different values of 16, 32, 64 and 128 according to the configurations of the system.

Each of the LLIDs 520 is representative of a specific one of the plurality of ONUs 101 connected to the single OLT 103, and is a logical link identifier or logical port number. When each of the ONUs 101 transmits the packet to the OLT 103 using the LLID information assigned by the OLT 103, the ONU 101 transmits a packet with LLID information combined therewith. The values of the LLIDs 520 are different from the unique numbers of the ONUs 101 for identifying the plurality of ONUs 103 connected to a single port of the OLT 103 in that the values of the LLIDs 520 are logical port numbers for logically identifying the plurality of ONUs 101 connected to the single OLT 103. Each of the LLIDs 520 has a unique value with respect to the ONUs 103, and each of the logical port numbers has a unique value within the OLT 103.

The ONU MAC addresses 530 represent the addresses of the plurality of ONUs 101 connected to the OLT 103, respectively. That is, the ONU MAC addresses 530 correspond to the MAC addresses of the ONUs 101 requesting connection from the OLT 103.

The VIDs 540 are a list of Virtual IDs (VIDs) for identifying groups of VLANs to which the ONUs 101 belong. Accordingly, in a frame transmitted from an ONU 101 connected to the OLT 103 is included a VID of a VLAN group to which the ONU 101 belongs. The VIDs 540 represent the values of such VIDs.

The authentication information fields 550 are used to determine whether the connection of the ONUs 101 is allowed or not. This authentication information fields 550 indicate information on whether the connection of the ONU MAC layers 250 is allowed (Y) or not (N).

The connection setup information fields 560 are used to determine whether the ONUs 101 have been connected to the OLT 103 and links have been set up therebetween. The connection setup information fields 560 indicate information whether the ONUs 101 having specific ONU MAC addresses are connected to the OLT 103.

The subscriber MAC table pointer fields 570 for the respective LLIDs are composed of pointer values for the MAC table. When logical ports are distinguished for the respective ONUs 101 connected to the OLT 103, the subscriber MAC table pointer fields 570 for the respective LLIDs are provided to learn the subscriber MAC addresses for the respective LLIDs. That is, subscriber MAC table pointer fields 570 for the respective LLIDs corresponds to points for the MAC table set up for the respective LLIDs.

Figure 6:
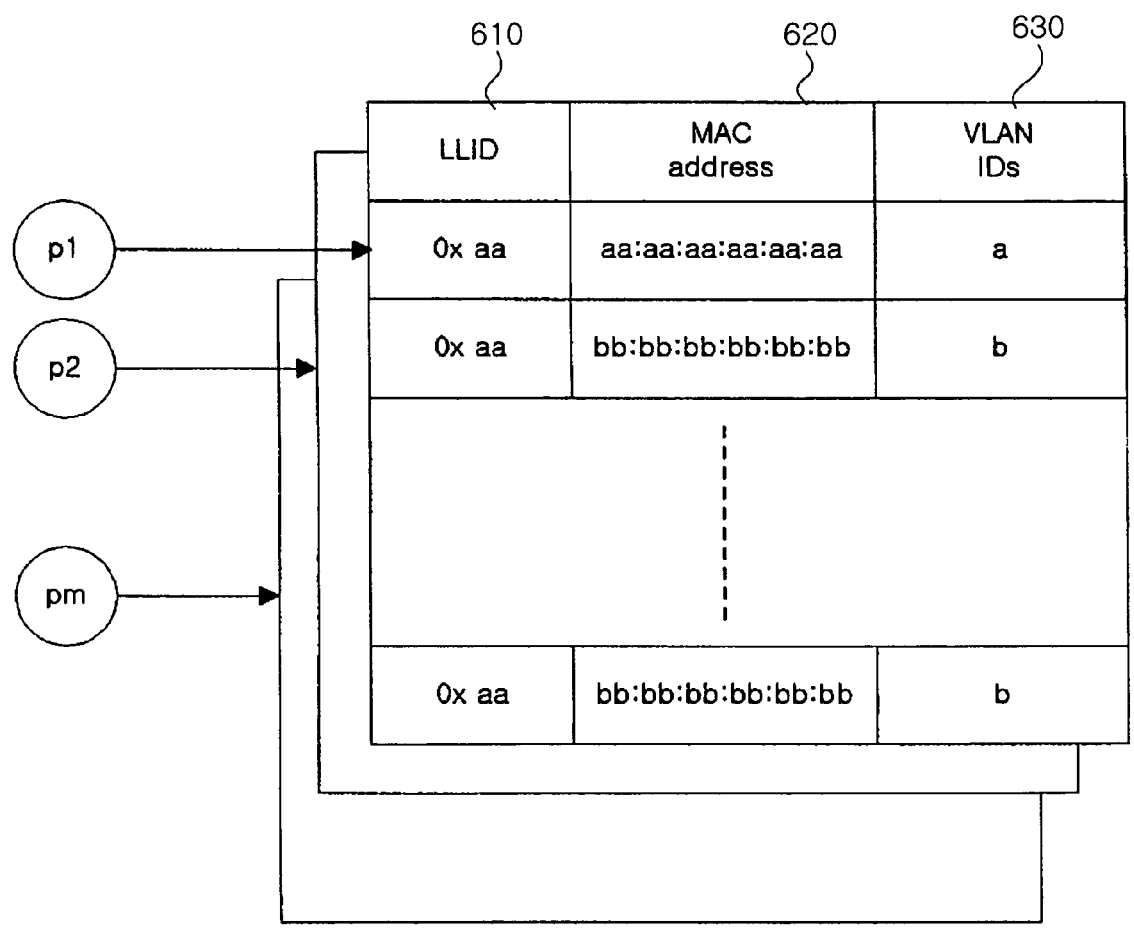
FIG. 6 is a MAC address table for respective LLIDs, which is used for bridging in the shared LAN emulation apparatus according to the embodiment of the present invention.

FIG. 6 is a MAC address table for respective LLIDs, which is used for bridging in the shared LAN emulation apparatus according to the embodiment of the present invention.

Referring to FIG. 6, the MAC address table learned for the respective LLIDs according to the embodiment of the present invention includes LLIDs 610, MAC addresses 620 and VIDs 630.

Figure 7:
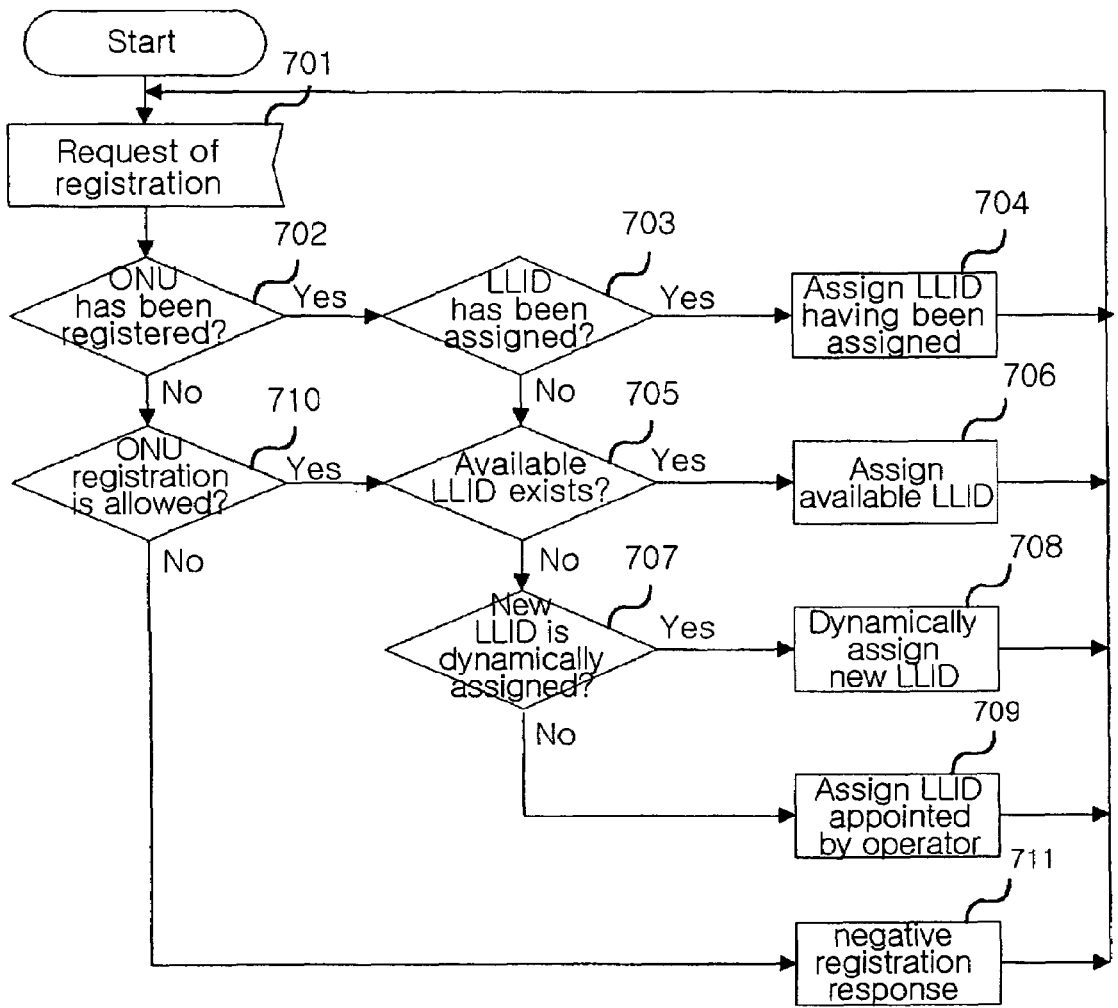
FIG. 7 is a flowchart showing a process of assigning LLIDs to ONUs according to an embodiment of the present invention.

Referring to FIG. 7, a process of the OLT 103 assigning the LLIDs to the ONUs 101 according to an embodiment of the present invention is described below. In the assignment of the LLIDs, available LLIDs are previously provided to the ports of the OLT 103, so that the available LLIDs can be dynamically assigned. A specific LLID having been assigned to a specific ONU 101 is always assigned only to the same ONU 101, so that a specific LLID is used as a value representative of a specific ONU 101. The process of assigning the LLIDs is described in more detail below.

At step 701, an ONU 101 requests registration from the OLT 103 to connect with the OLT 103.

Then, at step 702, the OLT 103 determines whether the ONU 101 having requested the registration has been registered. If, as a result of the determination at step 702, the ONU 101 has been already registered, the process proceeds to step 703. If the ONU 101 has not been registered, the process proceeds to step 710.

At step 703, it is determined whether a LLID assigned to the ONU 101 exists because the ONU 101 has been already registered. If, as a result of the determination at step 703, the assigned LLID exists, the process proceeds to step 704. If the assigned LLID does not exist, the process proceeds to step 705.

At step 704, the assigned LLID is assigned to the ONU 101 because the ONU 101 has been already registered and the LLID was assigned to the ONU 101.

Step 705 is performed in the state where the ONU 101 having requested the registration has been already registered but the LLID assigned to the ONU 101 does not exist. Accordingly, the OLT 103 determines whether available LLIDs exist at step 705. If, as a result of the determination, the available LLIDs exist, the process proceeds to step 706. If the available LLIDs do not exist, the process proceeds to step 707.

At step 706, the OLT 103 assigns one of the available LLIDs to the ONU 101 because the available LLIDs exist as a result of the determination at step 705.

At step 707, it is determined whether a new LLID can be dynamically assigned because the available LLID does not exist as a result of the determination at step 705. If, as a result of the determination at step 707, the new LLID can be dynamically assigned to the ONU 101, the process proceeds to step 708. If the new LLID cannot be dynamically assigned to the ONU 101, the process proceeds to step 709.

At step 708, the OLT 103 dynamically assigns the new LLID to the ONU 101 because the new LLID can be dynamically assigned to the ONU 101 as a result of the determination at step 707.

At step 709, the OLT 103 is provided with a separate LLID by an operator and assigns the separate LLID to the ONU 101 because the new LLID cannot be dynamically assigned to the ONU 101 as a result of the determination at step 707.

At step 710, the OLT 103 receives information on whether the registration of the ONU 101 is allowed from the operator because the ONU 101 has not been registered as a result of the determination at step 702. If, as a result of the determination at step 710, the registration of the ONU 101 is allowed, the process proceeds to step 705. If the registration of the ONU 101 is not allowed, the process proceeds to step 711.

If, as a result of the determination at step 710, the registration of the ONU 101 is allowed, the process performs steps 705 to 709. That is, it is determined whether available LLIDs exist at step 705. If the available LLIDs exist, one of the available LLIDs is assigned to the ONU 101 at step 706. In contrast, if the available LLIDs do not exist, it is determined whether a new LLID can be dynamically assigned at step 707. If the new LLID can be dynamically assigned, the new LLID is assigned to the ONU 101 at step 708. In contrast, if the new LLID cannot be dynamically assigned, a separate LLID appointed by the operator is assigned to the ONU 101 at step 709.

At step 711, the OLT 103 transmits a negative registration response to the ONU 101 having requested the registration because the registration of the ONU 101 is not allowed as a result of the determination at step 710.

The LLIDs assigned to the ONUs 101 connected to the OLT 103 as the logical port numbers thereof are managed or appointed by the operator.

When the unique LLIDs are assigned to all the ONUs 101 connected to the OLT 103 as described above, the LLIDs are widely used to identify all the ONUs connected to a single OLT 103 rather than identifying ONUs 101 connected to a single port of a single OLT 103. Furthermore, the LLIDs assigned as described above together with the ONU MAC addresses are used to update and refer to the information of the subscriber MAC table pointer field for respective LLIDs 570 shown in FIG. 5.

Figure 8:
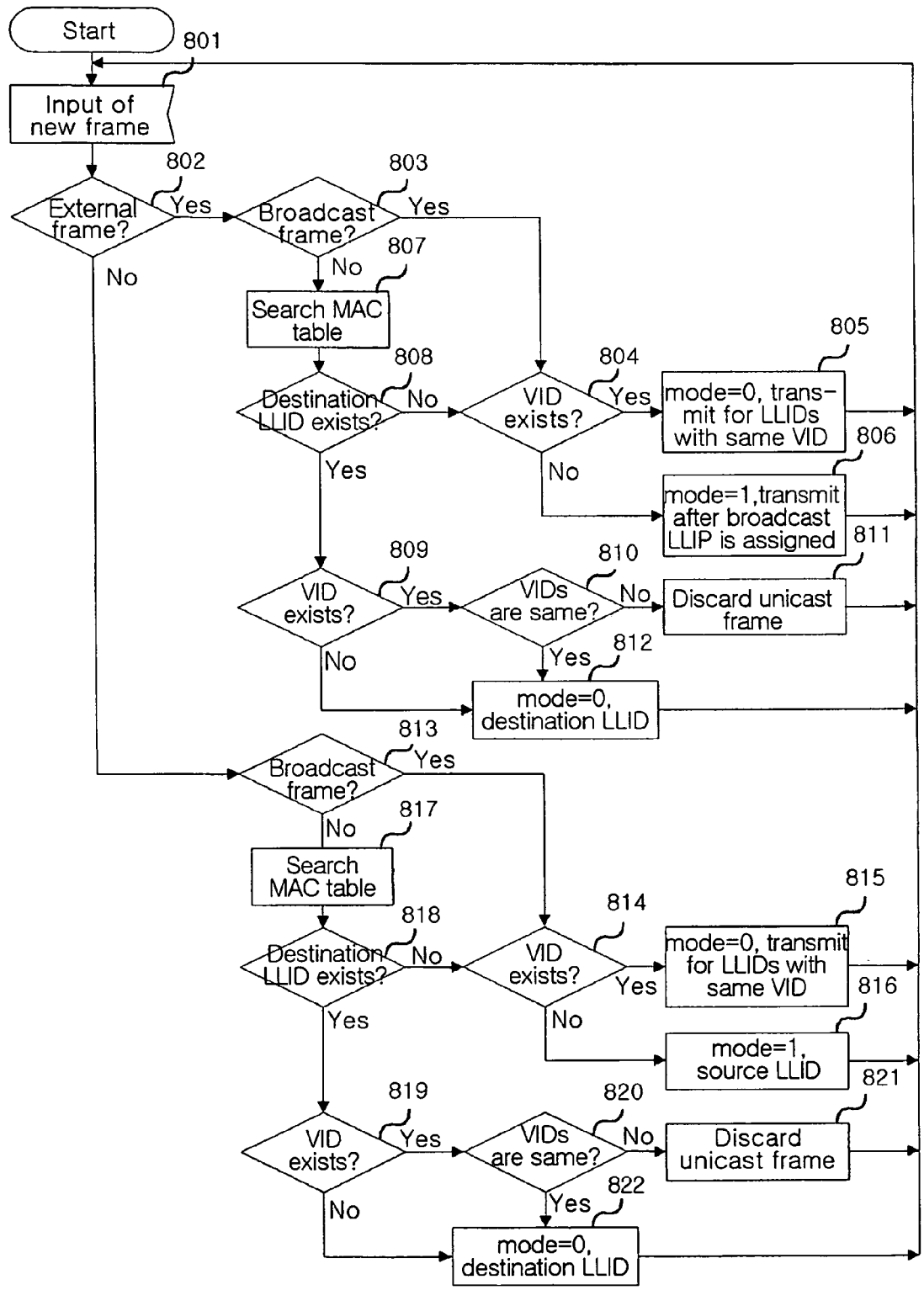
FIG. 8 is a flowchart showing a process of bridging an Ethernet frame at the SLE layer of the OLT according to an embodiment of the present invention.

FIG. 8 is a flowchart showing a process of bridging an Ethernet frame at the SLE layer 310 of the OLT 103 according to an embodiment of the present invention. The process of bridging an Ethernet frame is performed by the bridging unit 430 located in the SLE layer 310 of the OLT 103.

Referring to FIG. 8, a process of transmitting an Ethernet frame in the SLE layer 310 using a LLID, a VID and a destination Ethernet address is described in detail. In this case, a frame entering the SLE layer 310 from a layer higher than the SLE layer 310 is defined as an external frame. Additionally, a frame entering the SLE layer 310 from a layer lower than the SLE layer 310 is defined as an internal frame.

At step 801, a new frame reaches the SLE layer 310 of the OLT 103.

At step 802, it is determined whether the frame received by the SLE layer 310 corresponds to an external frame. If, as a result of the determination at step 802, the received frame corresponds to the external frame, the process proceeds to step 803. If the received frame does not correspond to the external frame, the process proceeds to step 803.

At step 803, it is determined whether the external frame corresponds to a broadcast frame. In this case, the term "broadcast frame" refers to a frame used to transmit a single data packet to an entire network. In this sense, the broadcast frame is distinguished from a unicast frame that is used to transmit a copy of data to each recipient. If the received frame corresponds to the broadcast frame, the process proceeds to step 804. If the received frame does not correspond to the broadcast frame, the process proceeds to step 807.

At step 804, it is determined whether a VID exists in the received frame because the received frame corresponds to the broadcast frame as a result of the determination at step 803. If the VID exists in the received frame, the process proceeds to step 805. If the VID does not exist in the received frame, the process proceeds to step 806.

Step 805 is performed when the received frame corresponds to both the external frame and the broadcast frame and has the VID. Accordingly, in this case, setting is performed so that only ONUs belonging to an ONU group with the same VID and having designated LLIDs can receive packets (mode=0, llid=LLIDs having same VID assigned), and the received frame is sequentially transmitted. In this case, 'mode=0' indicates a unicast transmission method.

Step 806 is performed when the received frame corresponds to both the external frame and the broadcast frame but does not have the VID. Accordingly, in this case, setting (mode=1, llid=Broadcast_LLID assigned) is performed so that all the ONUs can receive packets, and the received frame is transmitted. In this case, 'mode=1' designates a broadcasting transmission method.

Step 807 is performed when the received frame does not correspond to the broadcast frame as a result of the determination at step 803. In this case, the bridging unit 430 determines whether a destination MAC address and a LLID exist by searching the MAC table stored in the storage unit 410. Accordingly, using the destination address included in the received frame, it can be learned that the frame is transmitted to which of the ONUs 101, and a LLID representative of the ONU 101 can be assigned. The MAC table is set up by referring to source addresses. If a frame under examination does not have a destination address contained in the MAC table, this frame corresponds to the broadcast frame. If the frame has the destination address, the frame corresponds to the unicast frame.

At step 808, using the results obtained by the search of the MAC table, it is determined whether the destination LLID exists in the MAC table. If the destination LLID exists in the MAC table, steps 804 to 806 are performed. If not, the process proceeds to step 809.

If the received external frame does not correspond to the broadcast frame and doesn't have the destination LLID, it is determined whether a VID exists in the received frame at step 804. If the VID exists in the received frame, setting (mode=0, llid=LLIDs with same VID assigned) is performed so that only an ONU belonging to a VLAN group with the same VID and having a designated LLID can receive a packet, and the received frame is transmitted, at step 805. In contrast, if the VID does not exist in the received frame, setting (mode=1, llid=Broadcast_LLID assigned) is performed so that all the ONUs can receive packets, and the received frame is transmitted, at step 806.

Step 809 is performed when the received external frame does not correspond to the broadcast frame but has the destination LLID. In this case, it is determined whether a VID exists in the received frame. If the VID exists in the received frame, the process proceeds to step 810. If the VID does not exist in the received frame, the process proceeds to step 812.

At step 810, it is determined whether the VID of the frame is identical with the VID of the destination LLID because the received frame has the VID of the destination LLID. If the VID of the received frame is not identical with the VID of the destination LLID, the process proceeds to step 811. If the VID of the received frame is identical with the VID of the destination LLID, the process proceeds to step 812.

Step 811 is performed when the received frame has the VID of the destination LLID but the VID of the received frame is different from the VID of the destination LLID. In this case, the received unicast frame is discarded. The reason for this is to allow communication between the ONUs 101 of an ONU group having the identical VID and prevent the leakage of information to a LAN group having a different VID.

Step 812 is performed when the received frame has the VID of the destination LLID and the VID of the frame is identical with the VID of the destination LLID. In this case, the LLID of the frame is set to the destination LLID (mode=0, llid=destination_LLID assigned) and, thereafter, the unicast frame is transmitted. With this step, a bridging function is performed so that the received frame is bridged to the destination ONU 101.

Subsequent steps 813 to 822 process frames received by the SLE layer 310 in a manner similar to that of steps 803 to 812.

At step 813, it is determined whether the received frame corresponds to a broadcast frame because the received frame corresponds to the internal frame. If the received frame corresponds to the broadcast frame, the process proceeds to step 814. If the received frame does not correspond to the broadcast frame, the process proceeds to step 817.

At step 814, it is determined whether a VID exists in the received frame because the received frame corresponds to the broadcast frame as a result of the determination at step 813. If the VID exists in the received frame, the process proceeds to step 815. If the VID does not exist in the received frame, the process proceeds to step 816.

Step 815 is performed when the received frame corresponds to both the internal frame and the broadcast frame and has the VID. Accordingly, in this case, setting is performed so that only ONUs belonging to an ONU group with the same VID and having designated LLIDs can receive packets (mode=0, llid=LLIDs with same VID assigned), and the received frame is sequentially transmitted.

Step 816 is performed when the received frame corresponds to both the internal frame and the broadcast frame but does not have the VID. Accordingly, in this case, setting (mode=1, llid=source_LLID assigned) is performed so that only a source ONU cannot receive a packet, and the received frame is transmitted.

Step 817 is performed when the received frame does not correspond to the broadcast frame as a result of the determination at step 813. In this case, it is determined whether a destination MAC address and a LLID exist by searching the MAC table stored in the storage unit 410.

At step 818, using the results obtained by the search of the MAC table, it is determined whether the destination LLID exists in the MAC table. If, as the result of the determination at step 818, the destination LLID exists in the MAC table, steps 814 to 816 are performed. If not, the process proceeds to step 819.

That is, if the received frame does not correspond to the broadcast frame but has the destination LLID, it is determined whether a VID exists in the received frame at step 814. If the VID exists in the received frame, setting is performed so that only ONUs belonging to an ONU group with the same VID and having designated LLIDs can receive packets (mode=0, llid=LLIDs with same VID assigned), and the received frame is sequentially transmitted. In contrast, if the VID does not exist in the received frame, setting (mode=1, llid=source_LLID assigned) is performed so that only a source ONU cannot receive a packet, and the received frame is transmitted, at step 816.

Step 819 is performed when the received internal frame does not correspond to the broadcast frame but has the destination LLID. In this case, it is determined whether a VID exists in the received frame. If the VID exists in the received frame, the process proceeds to step 820. If the VID does not exist in the received frame, the process proceeds to step 822.

At step 820, it is determined whether the VID of the frame is identical with the VID of the destination LLID because the received frame has the VID of the destination LLID. If the VID of the received frame is not identical with the VID of the destination LLID, the process proceeds to step 821. If the VID of the received frame is identical with the VID of the destination LLID, the process proceeds to step 822.

Step 821 is performed when the received frame has the VID of the destination LLID but the VID of the received frame is different from the VID of the destination LLID. In this case, the received unicast frame is discarded. The reason for this is to allow communication between the ONUs 101 of an ONU group having the identical VID and prevent the leakage of information to a LAN group having a different VID.

Step 822 is performed when the received frame has the VID of the destination LLID and the VID of the frame is identical with the VID of the destination LLID. In this case, the LLID of the frame is set to the destination LLID (mode=0, llid=destination_LLID assigned) and, thereafter, the unicast frame is transmitted. With this step, a filtering function is performed so that the received frame is bridged to the destination ONU 101.

As described above, the present invention is advantageous in that the SLE layer corresponding to a layer higher than the MAC layers of the OLT in EPON is provided, and a procedure of assigning LLIDs corresponding to the logical port numbers of respective ONUs to the ONUs and a table for managing the assigned LLIDs are provided, so that functions confined to EPON having a point-to-multipoint architecture are processed at the SLE layer and interface with the upper layer is processed by a single matched interface compatible with IEEE 802.1D.

The present invention is advantageous in that a physical port can be easily implemented between the MAC layers and LLC layer of an OLT in EPON.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A shared Local Area Network (LAN) emulation method, comprising the steps of:
setting up a Logical Link Identifier (LLID) management table for assigning unique LLIDs to a plurality of Optical Network Units (ONUs) and managing the assigned LLIDs so as to identify the plurality of ONUs connected to a single Optical Line Terminal (OLT);
setting up a Media Access Control (MAC) address table for the LLIDs learning MAC addresses of the ONUs;

assigning the unique LLIDs to ONUs when the ONUs
request registration from the OLT; and bridging data frames, which are received by a Shared LAN
Emulation (SLE) layer of the OLT, using the LLIDs,
VIDs of Virtual LANs to which the ONUs belong and
destination MAC addresses of the data frames so as to
provide a single matched port between a Logical Link
Control (LLC) layer and a MAC layer of the OLT, wherein the step of assigning LLIDs comprises the steps
of:

if the ONUs having requested registration have been
already registered and LLIDs having been already
assigned to the ONUs exist in the MAC address table,
assigning the LLIDs having been already assigned to the
ONUs having requested registration;

if the ONUs having requested registration have been
already registered but the LLIDs having been already
assigned to the ONUs do not exist in the MAC address
table, assigning available LLIDs to the ONUs having
requested registration; and if the ONUs having requested registration have been
already registered but the LLIDs having been already
assigned to the ONUs and the available LLIDs do not
exist in the MAC address table, assigning new dynamic
LLIDs or LLIDs appointed by an operator to the ONUs
having requested registration.

2. The shared LAN emulation method as set forth in claim
1, wherein the LLID management table includes:

LLIDs for identifying the ONUs;

ONU MAC addresses corresponding to the MAC
addresses of the ONUs having requested connection
from the OLT;

VIDs for identifying virtual LANs of groups of ONUs to
which the ONUs belong;

authentication information fields for determining whether
connection of the ONUs is allowed;

connection setup information fields for determining
whether the ONUs have been connected to the OLT and
links have been set up therebetween; and subscriber MAC table pointer fields for the respective
LLTDs, the subscriber MAC table pointer fields corresponding to pointer values of the MAC table, the MAC
table being set up by learning the MAC addresses for the
respective LLIDs.

3. The shared LAN emulation method as set forth in claim
1, wherein the MAC address table includes LLIDs, MAC
addresses and VIDs.

4. The shared LAN emulation method as set forth in claim
1, wherein the step of bridging the data frames comprises the
steps of:

if each of the received data frames entering the SLE layer
corresponds to a broadcast frame and have a VID, transmitting the received data frame to only an ONU group
having a VID identical with the VID of the data frame;

if the received frame corresponds to the broadcast frame
entering the SLE layer from a layer higher than the SLE
layer but do not have a VID, transmitting the data frame
so that all the ONUs can receive packets;

if the received frame corresponds to the broadcast frame
entering the SLE layer from a layer lower than the SLE
layer but do not have a VID, transmitting the data frame
so that only an ONU having a source LLID cannot
receive a packet;

if the received frame has a VID corresponding to a destination LLID but the VID of the received frame is not
identical to the VID of any of the LLIDs in the MAC
address table, discarding the received unicast frame; and if the received frame has a VID corresponding to a destination LLID and the VID of the received frame is identical a VID of a LLID in the MAC address table, setting
the LLID of the frame to the corresponding LLID in the
MAC address table and transmitting the unicast frame.

5. A shared Local Area Network (LAN) emulation apparatus, comprising:

means for storing a Logical Link Identifier (LLID) management table for assigning unique LLIDs to a plurality
of Optical Network Units (ONUs) and managing the
assigned LLIDs so as to identify the plurality of ONUs
connected to a single Optical Line Terminal (OLT);

means for storing a Media Access Control MAC address
table for the LLIDs learning MAC addresses of the
ONUs;

a LLID management unit for assigning the unique LLIDs
to ONUs and managing the assigned LLTDs when the
ONUs request registration from the OLT; and a bridging unit for bridging data frames, which are received
by a Shared LAN Emulation (SLE) layer of the OLT,
using the LLIDs, VIDs of Virtual LANs to which the
ONUs belong and destination MAC addresses of the
data frames so as to provide a single matched port
between a Logical Link Control (LLC) layer and a MAC
layer of the OLT, wherein the LLIDs management unit comprises:

means for, if the ONUs having requested registration have
been already registered and LLIDs having been already
assigned to the ONUs exist in the MAC address table,
assigning the LLIDs having been already assigned to the
ONUs having requested registration;

means for, if the ONUs having requested registration have
been already registered but the LLIDs having been
already assigned to the ONUs do not exist in the MAC
address table, assigning available LLIDs to the ONUs
having requested registration; and means for, if the ONUs having requested registration have
been already registered but the LLIDs having been
already assigned to the ONUs and the available LLIDs
do not exist in the MAC address table, assigning new
dynamic LLIDs or LLIDs appointed by an operator to
the ONUs having requested registration.

6. The shared LAN emulation apparatus as set forth in
claim 5, wherein the LLID management table includes:

LLIDs for identifying the ONUs;

ONU MAC addresses corresponding to the MAC
addresses of the ONUs having requested connection
from the OLT;

VIDs for identifying virtual LANs of groups of ONUs to
which the ONUs belong;

authentication information fields for determining whether
connection of the ONUs is allowed;

connection setup information fields for determining
whether the ONUs have been connected to the OLT and
links have been set up therebetween; and subscriber MAC table pointer fields for the respective
LLIDs, the subscriber MAC table pointer fields corresponding to pointer values of the MAC table, the MAC
table being set up by learning the MAC addresses for the
respective LLIDs.

7. The shared LAN emulation apparatus as set forth in
claim 5, wherein the MAC address table includes LLIDs,
MAC addresses and VIDs.

8. The shared LAN emulation apparatus as set forth in
claim 5, wherein the bridging unit comprises:

means for, if each of the received data frames entering the
SLE layer corresponds to a broadcast frame and have a VID, transmitting the received data frame to only an ONU group having a VID identical with the VID of the data frame;

means for, if the received frame corresponds to the broadcast frame entering the SLE layer from a layer higher than the SLE layer but do not have a VID, transmitting the data frame so that all the ONUs can receive packets;

means for, if the received frame corresponds to the broadcast frame entering the SLE layer from a layer lower than the SLE layer but do not have a VID, transmitting the data frame so that only an ONU having a source LLID cannot receive a packet;

means for, if the received frame has a VID corresponding to a destination LLID but the VID of the received frame is not identical to the VID of any of the LLIDs in the MAC address table, discarding the received unicast frame; and means for, if the received frame has a VID corresponding to a destination LLID and the VID of the received frame is identical to a VID of a LLID in the MAC address table, setting the LLID of the frame to the corresponding LLID in the MAC address table and transmitting the unicast frame.

\* \* \* \* \*